(12) United States Patent
O'Hara et al.

(10) Patent No.: US 11,693,879 B2
(45) Date of Patent: Jul. 4, 2023

(54) COMPOSITE RELATIONSHIP DISCOVERY FRAMEWORK

(71) Applicant: BUSINESS OBJECTS SOFTWARE LTD., Dublin (IE)

(72) Inventors: Paul O'Hara, Dublin (IE); Ying Wu, Dublin (IE); Jiazheng Li, Dublin (IE); Cathal McGovern, Dublin (IE); Malte Christian Kaufmann, Dublin (IE); Esther Rodrigo Ortiz, Dublin (IE); Kerry O'Connor, Dublin (IE); Michael Golden, Dublin (IE); Satinder Singh, Dublin (IE); Vlad Zat, Dublin (IE)

(73) Assignee: BUSINESS OBJECTS SOFTWARE LTD., Dublin (IE)

( * ) Notice: Subject to any disclaimer, the term of this patent is extended or adjusted under 35 U.S.C. 154(b) by 241 days.

(21) Appl. No.: 17/324,667

(22) Filed: May 19, 2021

(65) Prior Publication Data

US 2022/0374450 A1 Nov. 24, 2022

(51) Int. Cl.
*G06F 16/26* (2019.01)
*G06F 16/2458* (2019.01)

(52) U.S. Cl.
CPC .......... *G06F 16/26* (2019.01); *G06F 16/2465* (2019.01)

(58) Field of Classification Search
CPC .............................. G06F 16/26; G06F 16/2465
See application file for complete search history.

(56) References Cited

U.S. PATENT DOCUMENTS

2002/0128998 A1* 9/2002 Kil ...................... G06F 16/2465
2009/0018996 A1* 1/2009 Hunt ...................... G06Q 30/02
(Continued)

OTHER PUBLICATIONS

Sheng-yi Jiang, Lian-xi Wang, Efficient feature selection based on correlation measure between continuous and discrete features, Information Processing Letters 116 (2016) pp. 203-215 (Year: 2016).*

*Primary Examiner* — Andrey Belousov
(74) *Attorney, Agent, or Firm* — Buckley, Maschoff & Talwalkar LLC

(57) ABSTRACT

Systems and methods include reception of a set of data including continuous features and a discrete feature, each continuous feature associated with a plurality of values and the discrete feature associated with a plurality of discrete values, determine, for each continuous feature, a relationship factor representing a relationship between the discrete feature and the continuous feature based on the plurality of values associated with the continuous feature and the plurality of discrete values, identify one of the continuous features associated with a largest one of the determined relationship factors, generate, for each of the other features, a correlation factor representing a correlation between the continuous feature and the identified continuous feature, determine, for each of the continuous features other than the identified continuous feature, a composite relationship score based on the relationship factor and the correlation factor associated with the feature, and present a visualization associated with the discrete feature, the identified continuous feature, and a continuous feature associated with a largest composite relationship score.

15 Claims, 7 Drawing Sheets

(56) References Cited

U.S. PATENT DOCUMENTS

| | | | |
|---|---|---|---|
| 2012/0313949 A1* | 12/2012 | Rope | G06F 16/9038 |
| | | | 345/440 |
| 2017/0177756 A1* | 6/2017 | Martin | G06F 30/20 |
| 2017/0199913 A1* | 7/2017 | Azzam | G06F 16/2465 |
| 2020/0184367 A1* | 6/2020 | Shivamoggi | G06F 18/2321 |
| 2020/0342262 A1* | 10/2020 | Feng | G06F 18/214 |

* cited by examiner

400

| ContFeat | Rel. Factor |
|---|---|
| Empl_Tenure | 0.5985 |
| Age | 0.4457 |
| Bonus_Objective | 0.4920 |
| Bonus_Total | 0.4058 |
| Bonus_Yield | 0.1169 |
| Contract_Tenure | 0.0219 |

| ContFeat | Relationship Factor | Absolute Correlation Factor |
|---|---|---|
| Empl_Tenure | 0.5985 | 1 |
| Age | 0.4457 | 0.939569 |
| Bonus_Objective | 0.4920 | 0.388869 |
| Bonus_Total | 0.4058 | 0.298987 |
| Bonus_Yield | 0.1169 | 0.295752 |
| Contract_Tenure | 0.0219 | 0.033895 |

| ContFeat | Relationship Factor | Absolute Correlation Factor | Composite Relationship Score |
|---|---|---|---|
| Empl_Tenure | 0.5985 | 1 | 0.5985 |
| Age | 0.4457 | 0.939569 | 0.4188 |
| Bonus_Objective | 0.4920 | 0.388869 | 0.1913 |
| Bonus_Total | 0.4058 | 0.298987 | 0.1213 |
| Bonus_Yield | 0.1169 | 0.295752 | 0.0345 |
| Contract_Tenure | 0.0219 | 0.033895 | 0.0007 |

*FIG. 6*

COMPOSITE RELATIONSHIP DISCOVERY FRAMEWORK

BACKGROUND

Today's organizations collect and store large volumes of data at an ever-increasing rate. Performing calculations upon or identifying patterns within this data can be time-consuming or even infeasible. Modern data analytics systems attempt to assist humans in efficiently understanding collected data. Such systems may provide machine learning techniques, purpose-designed mathematical functions, and data mining.

In data mining, potentially useful patterns are discovered within large amounts of collected data. Data mining allows the analysis of data from multiple perspectives, the identification of relationships within the data, and the categorization and summarization of these relationships. One type of relationship characterizes interactions between attributes of the data. For example, a relationship may be identified in which larger values of a Salary attribute are correlated to the value Male of a Gender attribute.

Identified relationships may themselves interact with other attributes and/or relationships. Continuing the above example, values of a Years-in-Service attribute may partially explain the strength of the identified relationship between the Salary and Gender attributes. Most large sets of data tend to exhibit various degrees of interactions between attributes. Identifying and understanding these interactions enables the discovery of otherwise-obscured knowledge and insights.

Systems are desired to provide an efficient, easily-applicable data mining process which interpretably identifies interactions between attributes and may thereby assist with corresponding decision making.

BRIEF DESCRIPTION OF THE DRAWINGS

FIG. 4 comprises tabular representations of relationship factors representing a relationship between a discrete feature and a plurality of continuous features according to some embodiments.

FIG. 5 comprises tabular representations of relationship factors representing a relationship between a discrete feature and a plurality of continuous features and corresponding absolute correlation factors according to some embodiments.

FIG. 6 comprises tabular representations of relationship factors representing a relationship between a discrete feature and a plurality of continuous features, corresponding absolute correlation factors, and composite relationship scores according to some embodiments.

DETAILED DESCRIPTION

The following description is provided to enable any person in the art to make and use the described embodiments and sets forth the best mode contemplated for carrying out some embodiments. Various modifications, however, will be readily-apparent to those in the art.

As used herein, a feature refers to an attribute of a set of data. In the case of tabular data, each column may be considered as representing a respective feature, while each row is a single instance of values for each feature. A continuous feature is represented using numeric data having an infinite number of possible values within a selected range, and a discrete feature is represented by data having a discrete number of possible values, or discrete values. Temperature is an example of a continuous feature, while days of the week and gender are examples of a discrete feature.

Some embodiments provide informational relationship discovery though constrained composite interaction data mining. Informational relationships may be discovered between each of several continuous features and a composition of a selected discrete feature and an algorithmically-determined continuous feature.

Embodiments may efficiently discover information explaining a relationship of each continuous feature towards the selected discrete feature in order to identify a continuous feature which is most closely related to the discrete feature. The relationship of each continuous feature to each other may be determined based on the identified continuous feature. The discovered information and determined relationships may be integrated to generate a composite relationship score for each continuous feature indicating a relationship of the continuous feature to the discrete feature and identified closely-related continuous feature.

The composite relationship scores enable the ranking of continuous features relative to the selected discrete feature and closely-related continuous feature. The ranks allow identification of interaction relationships between the closely-related continuous feature and remaining continuous features of the data relative to the selected discrete feature. Embodiments may therefore increase knowledge regarding the selected discrete feature and closely-related continuous feature, and their relationship with the remaining continuous features.

Figure 1:
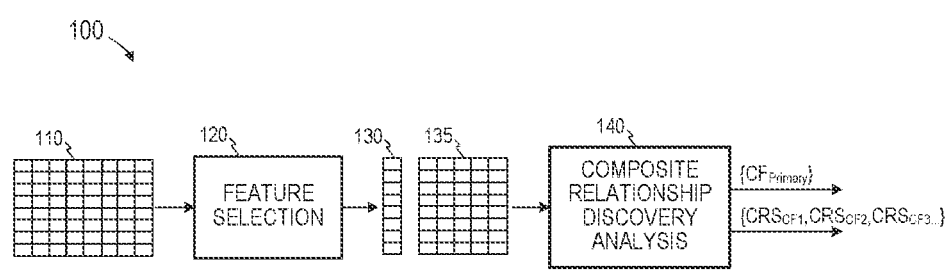
FIG. 1 is a block diagram of an architecture to discover composite relationships within a set of data according to some embodiments.

FIG. 1 is a block diagram of architecture 100 to discover composite relationships within a set of data according to some embodiments. The illustrated components may be implemented using any suitable combination of computing hardware and/or software that is or becomes known. In some embodiments, two or more components are implemented by a single computing device. Two or more components of FIG. 1 may be co-located. One or more components may be implemented as a cloud service (e.g., Software-as-a-Service, Platform-as-a-Service). A cloud-based implementation of any components of FIG. 1 may apportion computing resources elastically according to demand, need, price, and/or any other metric.

Data 110 may comprise values of a database table. More specifically, data 110 may comprise rows of a database table, with each row including a value of a corresponding database column, or feature. Data 110 consists of at least one discrete feature and two or more continuous features.

Feature selection component 120 constrains data 110, by identifying the discrete feature and continuous features for which a composite relationship discovery analysis is to be performed. In the FIG. 1 example, column 130 of data 110 includes values of a discrete feature selected by feature selection component 120 and columns 135 include values of continuous features selected by feature selection component 120.

Composite relationship discovery analysis component 140 initially determines a relationship factor for each selected continuous feature which represents the degree to which the continuous feature explains values of the selected discrete feature. Since component 140 independently applies a same analysis to each selected continuous feature, determination of the relationship factors is inherently scalable and applicable to massive concurrent parallel execution, for example using a cloud implementation architecture.

Based on the determined relationship factors, composite relationship discovery analysis component 140 identifies a primary continuous feature (e.g., $CF_{Primary}$ in FIG. 1) as the continuous feature associated with the largest relationship factor. Component 140 then determines, for each continuous feature, an absolute correlation factor representing an absolute correlation between the continuous feature and primary continuous feature. A composite relationship score is determined for each non-primary continuous feature based on the relationship factor and absolute correlation factor determined for each continuous feature. The composite relationship scores (e.g., $CRS_{CF1}$, $CRS_{CF2}$, $CRS_{CF3}$ in FIG. 1) provide information regarding the composite relationship between the discrete feature and the primary continuous feature and each other selected continuous feature. In particular, the greater the value of a composite relationship score associated with a continuous feature, the stronger the relationship between the respective bivariate relationship (i.e., between the discrete feature and the primary continuous feature) and the associated continuous feature.

Figure 2:
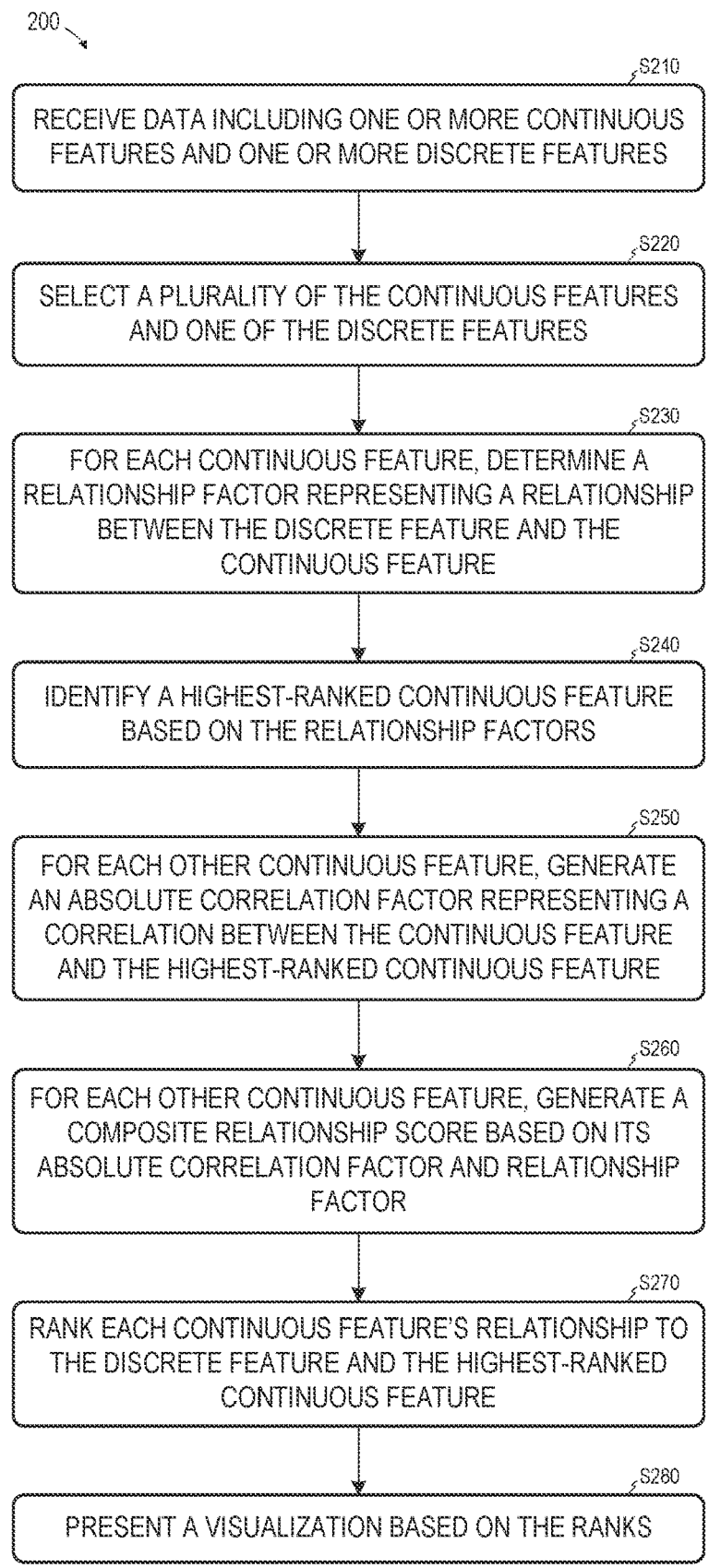
FIG. 2 comprises a flow diagram of a process to discover composite relationships within a set of data according to some embodiments.

FIG. 2 is a flow diagram of process 200 to discover composite relationships within a set of data according to some embodiments. Process 200 and the other processes described herein may be performed using any suitable combination of hardware and software. Software program code embodying these processes may be stored by any non-transitory tangible medium, including a fixed disk, a volatile or non-volatile random access memory, a DVD, a Flash drive, or a magnetic tape, and executed by any one or more processing units, including but not limited to a processor, a processor core, and a processor thread. Embodiments are not limited to the examples described below.

Process 200 may be initiated by a request to discover composite relationships within a set of data. Such a request may be received from an end-user via a data analytics application. In one non-exhaustive example, an end-user operates an analytics application to request an analysis of composite relationships within a Sales data table.

The data of interest is received at S210, in a structured format such as a tabular format. The structured format facilitates definition and identification of one or more continuous features and one or more discrete features with the dataset.

A plurality of the continuous features and one of the discrete features is selected, for example by the end-user, at S220. The selected continuous features may comprise all of the continuous features of the input data or a subset thereof. In some embodiments, if no continuous features are explicitly selected at S220, then all of the continuous features of the input data are passed to S230 along with the selected discrete feature.

Figure 3:
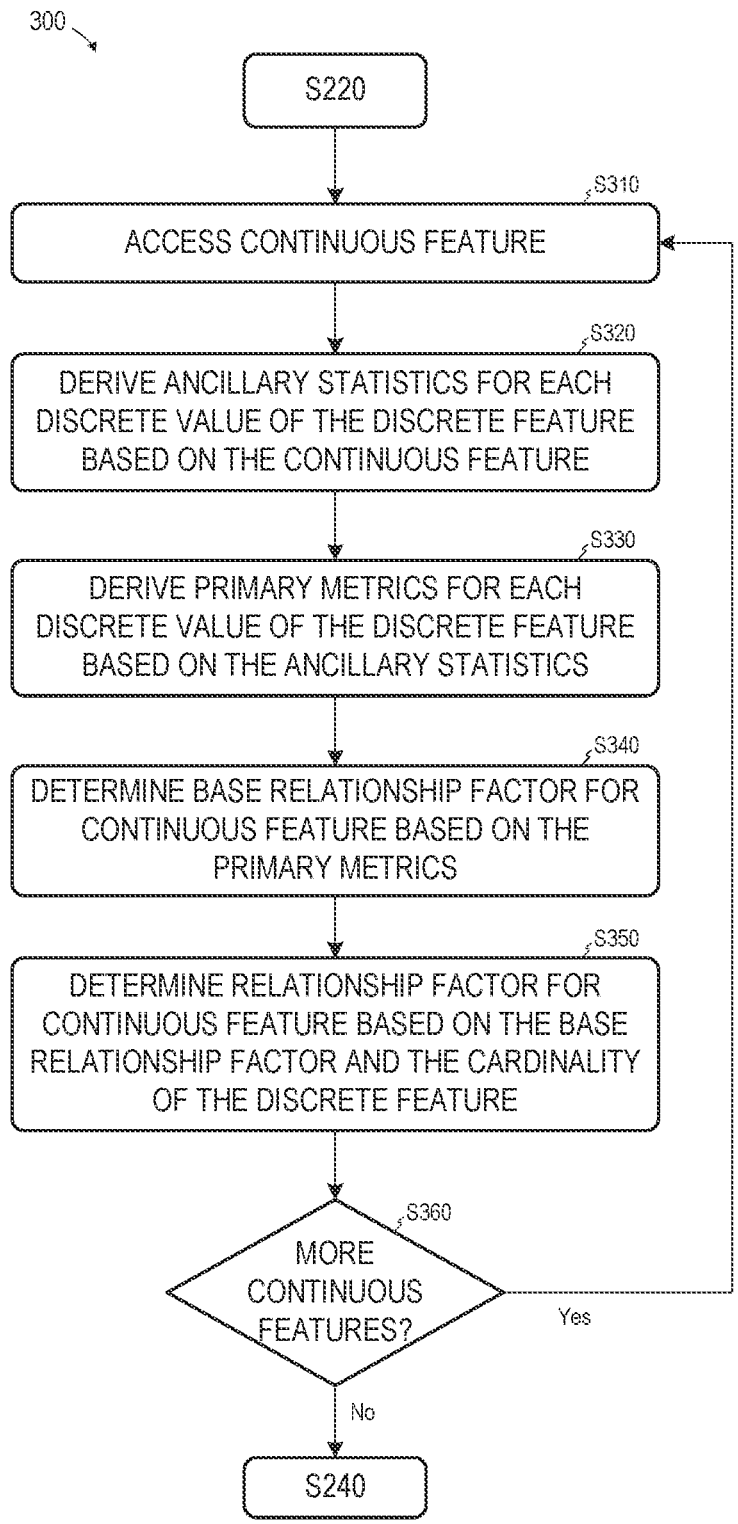
FIG. 3 comprises a flow diagram of a process to determine a relationship factor representing a relationship between a discrete feature and a continuous feature according to some embodiments.

A relationship factor is determined for each continuous feature at S230. The relationship factor determined for a continuous feature represents (i.e., quantifies) a relationship between the continuous feature and the discrete feature. Any system or method to determine the relationship factors at S230 may be utilized in some embodiments. Process 300 of FIG. 3 is an implementation of S230 according to some embodiments. Implementations of S230 are not limited to process 300.

A first one of the continuous features is accessed at S310. Such access may comprise retrieving all the values (i.e., the entire column) associated with the continuous feature. Next, at S320, ancillary statistics are derived for each discrete value of the discrete feature based on the continuous feature. The ancillary statistics may comprise a mean and a variance of the continuous feature associated with each discrete value of the discrete feature. In particular, each row of the continuous feature which corresponds to a first one of the discrete values is identified. A mean of the values of the continuous feature which are associated with these rows is then determined. A variance may be calculated from the mean $\bar{x}$ as follows:

$$\text{var}_{discrete\,value}(x) = \frac{\sum_{i=1}^{n}(x_i - \bar{x}_{discrete\,value})^2}{n-1}$$

where n is the number of rows of the continuous feature which correspond to the first one of the discrete values and x is the value of the continuous feature at each of such n rows. This process repeats for each discrete value of the discrete feature to result in a mean and a variance of the continuous feature for each discrete value.

Primary metrics are derived at S330 for each discrete value of the discrete feature based on the ancillary statistics derived for each discrete value. According to some embodiments, the primary statistics comprise a Sum of Squares Residual (SSR) and a Sum of Squares Total (SST). Derivation of the SSR and the SST for a particular discrete value requires pre-determination of a variance of the discrete value relative to the entire set of data (i.e., $\text{var}_{discrete\,value\,relative}$(x)), and a count of the total number of records associated with the discrete value (i.e., $\text{recordcount}_{discrete\,value}$(x)) For example, $$\text{var}_{discrete\,value\,relative}(x) = \frac{\sum_{i=1}^{n}(x_i - \bar{x}_{ds})^2}{n - relativesample}$$

where $\bar{x}_{ds}$ is the mean of the current continuous feature over the entire set of data, where n is again the number of rows of the continuous feature which correspond to the first one of the discrete values and x is again the value of the continuous feature at each of such n rows.

$$relativesample = \frac{n}{n_{ds}},$$

where $n_{ds}$ is the number of rows of the entire set of data.

Given the above, the SSR and SST may be determined as follows:

$$SSR_{discretevalue}(x) = \text{var}_{discretevalue}(x) *$$
$$\left(recordcount_{discretevalue}(x) - \left(1 - relativesample_{discretevalue(x)}\right)\right)$$
$$SST_{discretevalue}(x) = \text{var}_{discretevaluerelative}(x) * recordcount_{discretevalue}(x)$$

Next, a base relationship factor for the current continuous feature is determined at S340. In one example, the base relationship factor is determined based on the SSR and SST which was determined at S330 for each discrete value of the discrete feature:

$$\text{base relationship } factor_{continuous feature} = 1 - \left(\frac{\sum_{i=1}^{n} SSR_{discretevalue\,i}}{\sum_{i=1}^{n} SST_{discretevalue\,i}}\right)$$

A relationship factor for the current continuous feature is determined at S350 based on the base relationship factor determined at S340 and the cardinality $n_{discrete\ values}$ of the discrete feature (i.e., the number of distinct discrete values of the discrete feature). In some embodiments, a relationship factor having a value near 1.0 suggests the existence of a strong relationship between the associated continuous feature and the selected discrete feature, while a value near 0.0 suggests the absence of a relationship.

According to some embodiments, the relationship factor is determined at 350 as:

$$\text{relationship } factor_{continuous feature} =$$
$$1 - \left(\frac{(1 - \text{base relationship } factor_{continuous feature}) * (n_{ds} - 1)}{n_{ds} - n_{discrete values} - 1}\right)$$

Flow proceeds from S350 to S360. If any selected continuous features remain, flow returns to S310 and continues as described above. Accordingly, flow cycles between S310 and S360 until a relationship factor has been determined for each selected continuous feature.

Returning to process 200, a highest-ranked continuous feature is identified based on the determined relationship factors. FIG. 4 illustrates table 400 associating each of six selected continuous features with a relationship factor determined as described above. Table 400 lists the continuous features in descending order of relationship factor. Of the selected continuous features, the highest-ranked continuous feature (i.e., Empl_Tenure) presents the strongest explainable informational relationship with the selected discrete feature, and is identified at S240.

For each other (i.e., not highest-ranked) continuous feature, an absolute correlation factor is generated at S250. In some embodiments, a subset of the continuous features is selected for absolute correlation factor generation at S250, based on their relationship factors. For example, the second through fifth highest-ranked continuous features may be selected. If no subset is selected, absolute correlation factors are generated for all continuous features.

The absolute correlation factor for a given continuous feature represents a correlation between the continuous feature and the highest-ranked continuous feature. A correlation factor measures the strength and direction of the linear relationship between the two continuous features. The correlation factor can range between −1.0 and 1.0, where 1.0 indicates a perfect positive correlation, and −1.0 indicates a perfect negative correlation. A correlation factor of 0.0 indicates no relationship exists between the given continuous feature and the highest-ranked continuous feature.

The absolute correlation factor determined at S250 is an absolute value of a correlation factor, in that the direction of the relationship is ignored. Accordingly, the absolute correlation value may range between 0.0 and 1.0. A value of 0.0 indicates no relationship, and a value of 1.0 indicates perfect correlation (e.g., one continuous feature is weight in grams and the other continuous feature is weight in kilograms).

For each continuous feature y, an absolute correlation factor $corr_{xy}$ may be determined in some embodiments as:

$$corr_{xy} = \left|\frac{\sum_{i=1}^{n}(x_i - \overline{x})(y_i - \overline{y})}{\sqrt{\sum_{i=1}^{n}(x_i - \overline{x})^2 \sum_{i=1}^{n}(y_i - \overline{y})^2}}\right|$$

where x=the highest-ranked continuous feature (according to relationship factor), $\overline{x}$=the mean of the continuous feature x, and $\overline{y}$=the mean of continuous feature y.

FIG. 5 illustrates table 500 associating each of six selected continuous features and corresponding relationship factors of table 400 with an absolute correlation factor determined at S250. At S260, and for each continuous feature, a composite relationship score is generated based on the absolute correlation factor and the relationship factor corresponding to the feature.

According to some embodiments, and prior to generation of the composite relationship scores, the absolute correlation factors are adjusted to reduce the importance of continuous features which are perfectly-correlated with one another. For example, the value 1.0 is added to any absolute correlation factors which are less than 1.0, and any absolute correlation factors which are equal to 1.0 are unchanged.

Generation of a composite relationship score for a continuous feature may proceed as follows:

composite relationship $score_{continuous\ fature} =$ relationship $factor_{continuous\ feature} *$ absolute correlation $factor_{continuous\ feature}$ FIG. 6 illustrates table 600 associating each of six selected continuous features of table 500 with a composite relationship score determined at S260. Table 600 is arranged in descending order of composite relationship score at S270 in order to reflect a rank of each continuous feature's relationship to the discrete feature and the highest-ranked continuous feature.

Figure 7:
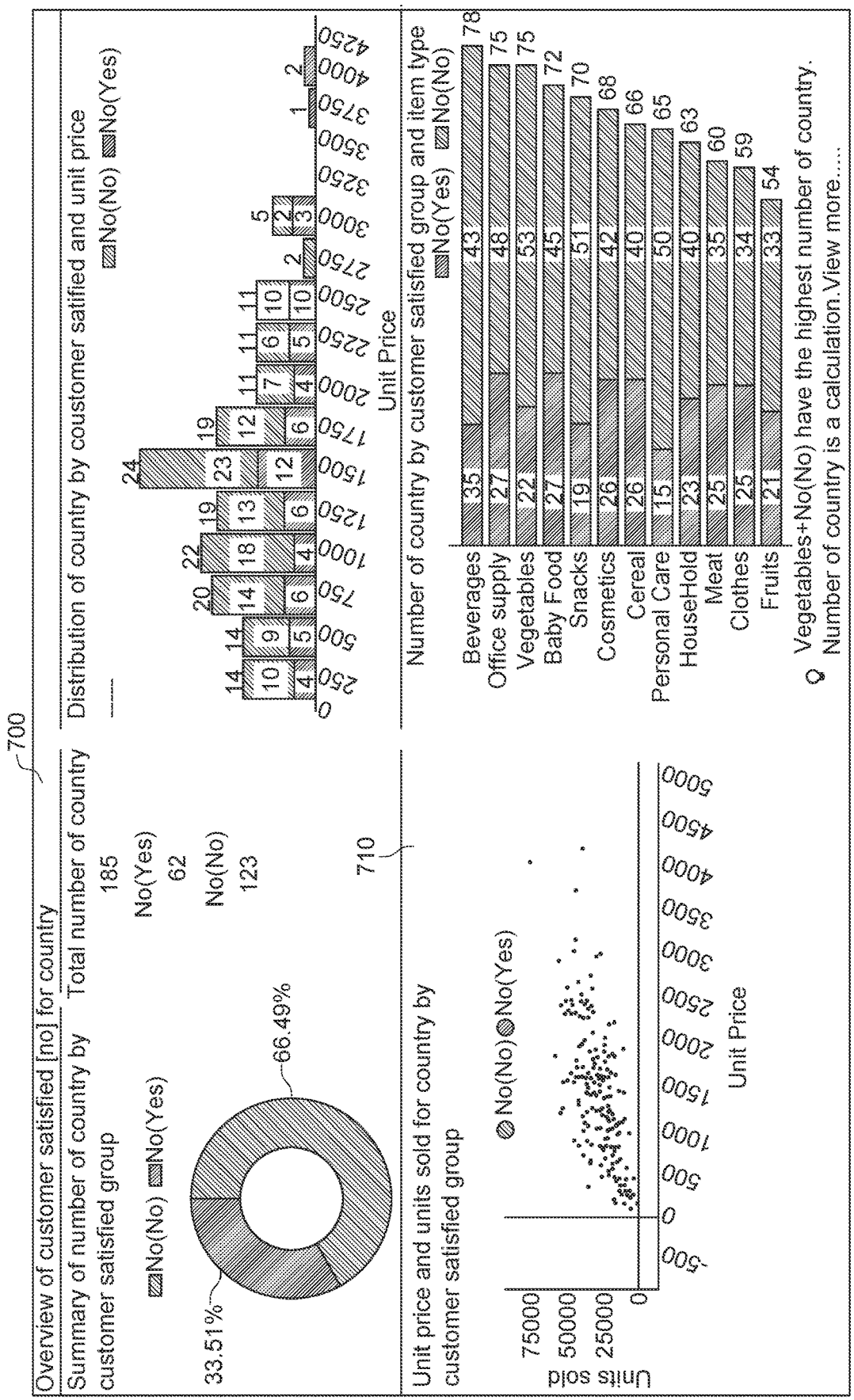
FIG. 7 is an outward view of a user interface presenting relationships between a discrete feature, a highest-ranked continuous feature, and another continuous feature according to some embodiments.

A visualization is presented based on the ranks at S280. FIG. 7 illustrates user interface 700 of a data analysis application for visualizing composite relationships within a set of data according to some embodiments. A user may execute a Web browser to access the application via HyperText Transfer Protocol and receive user interface 700 in return.

User interface 700 provides information associated with the discrete feature Customer Satisfied, which may have been selected from a set of data by a user at S220. It is assumed that the continuous feature Unit Price has been determined as the highest-ranked continuous feature of the set of data at S240 as described above. It is also assumed that the continuous feature Units Sold is determined to have the highest composite relationship score of the other continuous features of the set of data. Accordingly, visualization 710 presents a scatterplot relating the feature Customer Satisfied, with the determined continuous features Unit Price and Units Sold.

Figure 8:
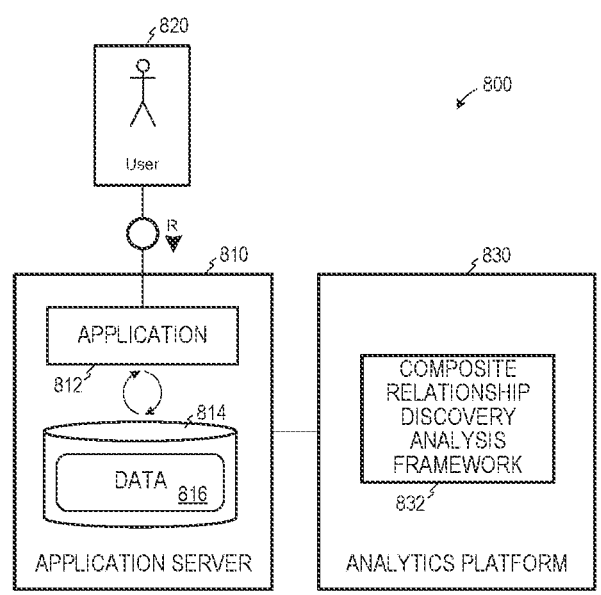
FIG. 8 illustrates a system to provide data analytics according to some embodiments.

FIG. 8 illustrates system 800 to provide data analytics to applications according to some embodiments. Application server 810 may comprise an on-premise or cloud-implemented server providing an execution platform and services to applications such as application 812. Application 812 may comprise program code executable by a processing unit to provide functions to users such as user 820 based on logic and on data 816 stored in data store 814. Data 816 may be column-based, row-based, object data or any other type of data that is or becomes known. Data store 814 may comprise any suitable storage system such as a database system, which may be partially or fully remote from application server 810, and may be distributed as is known in the art.

According to some embodiments, user 820 may interact with application 812 (e.g., via a Web browser executing a front-end UI application associated with application 812) to request analysis of a set of data within data 816. To perform this analysis, application 812 may access analytics platform 830. Analytics platform 830 may also be implemented by on-premise or cloud-based servers.

Analytics platform 830 includes program code of composite relationship discovery analysis framework 832, which may be executed to identify and quantify relationships between a discrete feature, a highest-ranked continuous feature and other continuous features as described herein. These relationships may be provided to application 812 for presentation to user 820. According to some embodiments, application 812 is capable of discovering and analyzing composite relationships as described herein. Analytics platform 830 may provide additional functionality to applications, such as but not limited to machine learning model training and inference.

Figure 9:
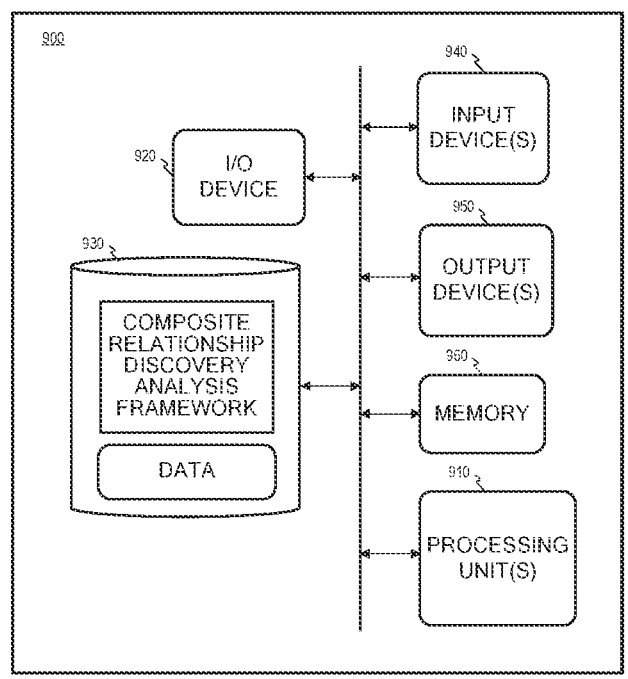
FIG. 9 is a block diagram of a hardware system for discovering composite relationships within a set of data according to some embodiments.

FIG. 9 is a block diagram of a hardware system for determining proportional contributions according to some embodiments. Hardware system 900 may comprise a general-purpose computing apparatus and may execute program code to perform any of the functions described herein. Hardware system 900 may be implemented by a distributed cloud-based server and may comprise an implementation of analytics platform 830 in some embodiments. Hardware system 900 may include other unshown elements according to some embodiments.

Hardware system 900 includes processing unit(s) 910 operatively coupled to I/O device 920, data storage device 930, one or more input devices 940, one or more output devices 950 and memory 960. I/O device 920 may facilitate data exchange with external devices, such as an external network, the cloud, or a data storage device. Input device(s) 940 may comprise, for example, a keyboard, a keypad, a mouse or other pointing device, a microphone, knob or a switch, an infra-red (IR) port, a docking station, and/or a touch screen. Input device(s) 940 may be used, for example, to enter information into hardware system 900. Output device(s) 950 may comprise, for example, a display (e.g., a display screen) a speaker, and/or a printer.

Data storage device 930 may comprise any appropriate persistent storage device, including combinations of magnetic storage devices (e.g., magnetic tape, hard disk drives and flash memory), optical storage devices, Read Only Memory (ROM) devices, and RAM devices, while memory 960 may comprise a RAM device.

Data storage device 930 stores program code executed by processing unit(s) 910 to cause system 900 to implement any of the components and execute any one or more of the processes described herein. Embodiments are not limited to execution of these processes by a single computing device. Data storage device 930 may also store data and other program code for providing additional functionality and/or which are necessary for operation of hardware system 900, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processing unit to execute program code such that the computing device operates as described herein.

Embodiments described herein are solely for the purpose of illustration. Those in the art will recognize other embodiments may be practiced with modifications and alterations to that described above.

What is claimed is:

1. A system comprising:
   a memory storing processor-executable program code; and
   a processing unit to execute the processor-executable program code to cause the system to:
   receive a set of data including a plurality of continuous features and a discrete feature, each of the plurality of continuous features associated with a plurality of values and the discrete feature associated with a plurality of discrete values;
   for each of the plurality of continuous features, determine a relationship factor representing a relationship between the discrete feature and the continuous feature based on the plurality of values associated with the continuous feature and the plurality of discrete values;
   identify one of the plurality of continuous features associated with a largest one of the determined relationship factors;
   for each of the plurality of continuous features other than the identified continuous feature, generate a correlation factor representing a correlation between the continuous feature and the identified continuous feature;
   for each of the plurality of continuous features other than the identified continuous feature, determine a composite relationship score based on the relationship factor and the correlation factor associated with the feature; and
   present a visualization associated with the discrete feature, the identified continuous feature, and a continuous feature associated with a largest composite relationship score.

2. A system according to claim 1, wherein determination of a relationship factor for a continuous feature comprises:
   derivation of ancillary statistics for each discrete value of the discrete feature based on the plurality of values associated with the continuous feature;

for each discrete value, derivation of primary metrics based on the ancillary metrics derived for the discrete value;

for each continuous feature, determination of a base relationship factor based on the primary metrics derived for the discrete value; and for each continuous feature, determination of the relationship factor based on the base relationship factor determined for the continuous feature and a cardinality of the discrete feature.

3. A system according to claim 2, wherein determination of the ancillary statistics for a discrete value comprises:

determination, for each continuous measure, of a mean of the values of the continuous measure associated with the discrete value; and determination, for each continuous measure, of a variance of the values of the continuous measure associated with the discrete value.

4. A system according to claim 3, wherein determination of the primary statistics for a discrete value comprises:

determination of a Sum of Squares Residual based on the determined variances; and determination of a Sum of Squares Total based on the determined means.

5. A system according to claim 1, wherein the presented visualization is associated with the discrete feature, the identified continuous feature, the continuous feature associated with the largest composite relationship score, and a continuous feature associated with a second-largest composite relationship score.

6. A method comprising:

receiving a set of data including a plurality of continuous features and a discrete feature, each of the plurality of continuous features associated with a plurality of values and the discrete feature associated with a plurality of discrete values;

for each of the plurality of continuous features, determining a relationship factor representing a relationship between the discrete feature and the continuous feature based on the plurality of values associated with the continuous feature and the plurality of discrete values;

identifying one of the plurality of continuous features associated with a largest one of the determined relationship factors;

for each of the plurality of continuous features other than the identified continuous feature, generating a correlation factor representing a correlation between the continuous feature and the identified continuous feature;

for each of the plurality of continuous features other than the identified continuous feature, determining a composite relationship score based on the relationship factor and the correlation factor associated with the feature; and presenting a visualization associated with the discrete feature, the identified continuous feature, and a continuous feature associated with a largest composite relationship score.

7. A method according to claim 6, wherein determining a relationship factor for a continuous feature comprises:

deriving ancillary statistics for each discrete value of the discrete feature based on the plurality of values associated with the continuous feature;

for each discrete value, deriving primary metrics based on the ancillary metrics derived for the discrete value;

for each continuous feature, determining a base relationship factor based on the primary metrics derived for the discrete value; and for each continuous feature, determining the relationship factor based on the base relationship factor determined for the continuous feature and a cardinality of the discrete feature.

8. A method according to claim 7, wherein determining the ancillary statistics for a discrete value comprises:

determining, for each continuous measure, of a mean of the values of the continuous measure associated with the discrete value; and determining, for each continuous measure, of a variance of the values of the continuous measure associated with the discrete value.

9. A method according to claim 8, wherein determining the primary statistics for a discrete value comprises:

determining a Sum of Squares Residual based on the determined variances; and determining a Sum of Squares Total based on the determined means.

10. A method according to claim 6, wherein the presented visualization is associated with the discrete feature, the identified continuous feature, the continuous feature associated with the largest composite relationship score, and a continuous feature associated with a second-largest composite relationship score.

11. A non-transitory medium storing processor-executable program code executable by a processing unit of a computing system to cause the computing system to:

receive a set of data including a plurality of continuous features and a discrete feature, each of the plurality of continuous features associated with a plurality of values and the discrete feature associated with a plurality of discrete values;

for each of the plurality of continuous features, determine a relationship factor representing a relationship between the discrete feature and the continuous feature based on the plurality of values associated with the continuous feature and the plurality of discrete values;

identify one of the plurality of continuous features associated with a largest one of the determined relationship factors;

for each of the plurality of continuous features other than the identified continuous feature, generate a correlation factor representing a correlation between the continuous feature and the identified continuous feature;

for each of the plurality of continuous features other than the identified continuous feature, determine a composite relationship score based on the relationship factor and the correlation factor associated with the feature; and present a visualization associated with the discrete feature, the identified continuous feature, and a continuous feature associated with a largest composite relationship score.

12. A medium according to claim 11, wherein determination of a relationship factor for a continuous feature comprises:

derivation of ancillary statistics for each discrete value of the discrete feature based on the plurality of values associated with the continuous feature;

for each discrete value, derivation of primary metrics based on the ancillary metrics derived for the discrete value;

for each continuous feature, determination of a base relationship factor based on the primary metrics derived for the discrete value; and for each continuous feature, determination of the relationship factor based on the base relationship factor determined for the continuous feature and a cardinality of the discrete feature.

13. A medium according to claim 12, wherein determination of the ancillary statistics for a discrete value comprises:

determination, for each continuous measure, of a mean of the values of the continuous measure associated with the discrete value; and determination, for each continuous measure, of a variance of the values of the continuous measure associated with the discrete value.

14. A medium according to claim 13, wherein determination of the primary statistics for a discrete value comprises:

determination of a Sum of Squares Residual based on the determined variances; and determination of a Sum of Squares Total based on the determined means.

15. A medium according to claim 11, wherein the presented visualization is associated with the discrete feature, the identified continuous feature, the continuous feature associated with the largest composite relationship score, and a continuous feature associated with a second-largest composite relationship score.

* * * * *